US010983523B2

(12) United States Patent
Sim

(10) Patent No.: US 10,983,523 B2
(45) Date of Patent: Apr. 20, 2021

(54) AUTONOMOUS DRIVING SUPPORT APPARATUS AND METHOD

(71) Applicant: MANDO CORPORATION, Pyeongtaek-si (KR)

(72) Inventor: Sang Kyun Sim, Anyang-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 198 days.

(21) Appl. No.: 16/157,742

(22) Filed: Oct. 11, 2018

(65) Prior Publication Data

US 2019/0113925 A1 Apr. 18, 2019

(30) Foreign Application Priority Data

Oct. 16, 2017 (KR) .......................... 10-2017-0133860

(51) Int. Cl.
*G05D 1/02* (2020.01)
*B60W 30/12* (2020.01)
(Continued)

(52) U.S. Cl.
CPC ........... *G05D 1/0214* (2013.01); *B60W 30/12* (2013.01); *B60W 30/18163* (2013.01);
(Continued)

(58) Field of Classification Search
CPC ......... G05D 1/0214; G05D 2201/0213; G05D 1/0278; B60W 30/12; B60W 30/18163;
(Continued)

(56) References Cited

U.S. PATENT DOCUMENTS 8,527,199 B1 9/2013 Burnette et al.
8,996,226 B1 3/2015 Chatham et al.
(Continued)

FOREIGN PATENT DOCUMENTS

JP 5275059 B2 * 8/2013
JP 2013168178 A * 8/2013
(Continued)

OTHER PUBLICATIONS

Paolo et al., "A Semi-Autonomous UAV Platform for Indoor Remote Operation with Visual and Haptic Feedback," 2014, Publisher: IEEE.*

(Continued)

*Primary Examiner* — Tuan C To
(74) *Attorney, Agent, or Firm* — Morgan, Lewis & Bockius LLP

(57) ABSTRACT

The present disclosure relates to an autonomous driving support apparatus and method capable of generating road information for autonomous driving, correcting an error, and updating the road information. The autonomous driving support apparatus of the present disclosure includes at least one autonomous vehicle and a server. The autonomous vehicle senses a traveling road to generate camera recognition information including road information, signpost information, traffic light information, construction section information, and future route information. The server analyzes at least one piece of camera recognition information received from a controller of the at least one autonomous vehicle to update predetermined road map information, and transmits the updated road map information to the at least one autonomous vehicle.

15 Claims, 7 Drawing Sheets

(51) Int. Cl.
| | |
|---|---|
| *B60W 30/18* | (2012.01) |
| *B60W 50/14* | (2020.01) |
| *G01C 21/28* | (2006.01) |
| *G06K 9/00* | (2006.01) |
| *G06K 9/62* | (2006.01) |
| *G01C 21/32* | (2006.01) |
| *H04W 4/024* | (2018.01) |
| *H04W 4/44* | (2018.01) |

(52) U.S. Cl.
CPC .......... *B60W 50/14* (2013.01); *G01C 21/28* (2013.01); *G01C 21/32* (2013.01); *G05D 1/0278* (2013.01); *G06K 9/00798* (2013.01); *G06K 9/00818* (2013.01); *G06K 9/6201* (2013.01); *B60W 2050/143* (2013.01); *B60W 2420/42* (2013.01); *B60W 2554/80* (2020.02); *B60W 2556/50* (2020.02); *G05D 2201/0213* (2013.01); *G06K 9/00825* (2013.01); *H04W 4/024* (2018.02); *H04W 4/44* (2018.02)

(58) Field of Classification Search
CPC ......... B60W 2556/50; B60W 2554/80; B60W 2050/143; B60W 2420/42; B60W 50/14; G01C 21/28; G01C 21/32; G06K 9/00798; G06K 9/00818; G06K 9/00825; G06K 9/6201; H04W 4/024; H04W 4/44
USPC .......................................................... 701/26
See application file for complete search history.

(56) References Cited

U.S. PATENT DOCUMENTS

| | | | | |
|---|---|---|---|---|
| 9,719,801 | B1* | 8/2017 | Ferguson | G01C 25/00 |
| 9,761,096 | B2* | 9/2017 | McMahan | G08B 7/062 |
| 9,779,314 | B1* | 10/2017 | Wendel | G06K 9/00825 |
| 10,063,434 | B1* | 8/2018 | Khanal | G06N 20/00 |
| 10,379,533 | B2* | 8/2019 | Bier | G05D 1/0212 |
| 10,584,971 | B1* | 3/2020 | Askeland | G01C 21/30 |
| 2013/0085935 | A1* | 4/2013 | Nepomniachtchi | G06K 9/38 705/40 |
| 2015/0379993 | A1* | 12/2015 | Subhojit | G10L 15/06 704/275 |
| 2016/0334230 | A1* | 11/2016 | Ross | G01C 21/3415 |
| 2017/0123434 | A1* | 5/2017 | Urano | G01S 19/42 |
| 2017/0248960 | A1 | 8/2017 | Shashua et al. | |
| 2018/0101177 | A1* | 4/2018 | Cohen | G06K 9/00805 |
| 2018/0190016 | A1* | 7/2018 | Yang | G01C 21/32 |
| 2018/0201187 | A1* | 7/2018 | Yellambalase | B60L 3/0023 |
| 2018/0211111 | A1* | 7/2018 | Viswanathan | G06K 9/6219 |
| 2018/0247262 | A1* | 8/2018 | Arena | G06Q 10/0833 |
| 2018/0267547 | A1* | 9/2018 | Michalakis | G08G 1/096725 |
| 2018/0284801 | A1* | 10/2018 | Guterman | B25J 9/1697 |
| 2018/0341277 | A1* | 11/2018 | Yang | A63F 13/34 |
| 2019/0019409 | A1* | 1/2019 | Farr | G08G 1/0965 |
| 2019/0056741 | A1* | 2/2019 | Zych | B60W 30/09 |
| 2019/0087049 | A1* | 3/2019 | Mani | G08B 6/00 |
| 2019/0382049 | A1* | 12/2019 | Ueda | G06K 9/00825 |

FOREIGN PATENT DOCUMENTS

| | | | | |
|---|---|---|---|---|
| KR | 20150081975 A | * | 7/2015 | |
| WO | WO-2013173749 A1 | * | 11/2013 | G06T 5/10 |
| WO | 2017/029775 A1 | | 2/2017 | |

OTHER PUBLICATIONS

Xiaoying He, "Change Detection for Map Updating with Classification Posterior Probability of HJ Image and TM Image," 2011, Publisher: IEEE.*

Zheng-Hao et al., "Autonomous Robot Driving Decision Strategy Following Road Signs and Traffic Rules: Simulation Validation," 2016, Publisher: IEEE.*

Search Report issued in corresponding European Application No. 18200825.0, dated Mar. 18, 2019.

* cited by examiner

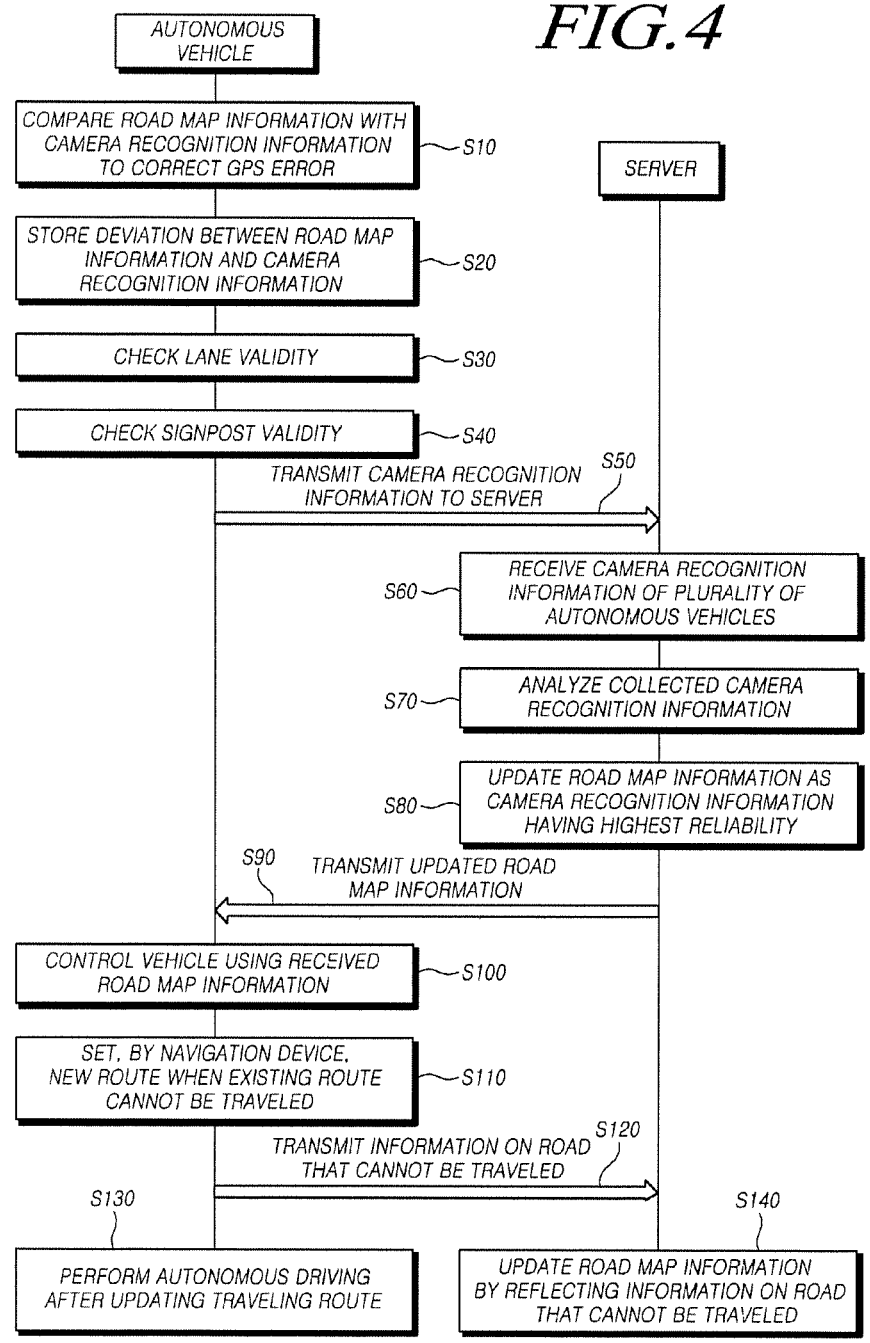

FIG.5

| | CAMERA | MAP | VALIDATION |
|---|---|---|---|
| LANE RECOGNITION | LANE RECOGNITION | LANE RECOGNITION | LANE WIDTH/CURVATURE COMPARISON --> LANE MISRECOGNITION FILTERING |
| | LANE NON-RECOGNITION | LANE RECOGNITION | CORRECTING MAP INFORMATION -BASED LANE |
| | LANE RECOGNITION | LANE NON-RECOGNITION | USING CAMERA RECOGNITION INFORMATION |
| | LANE NON-RECOGNITION | LANE NON-RECOGNITION | LANE NON-RECOGNITION |

AUTONOMOUS DRIVING SUPPORT APPARATUS AND METHOD

CROSS REFERENCE TO RELATED APPLICATION

This application claims priority from Korean Patent Application No. 10-2017-0133860, filed on Oct. 16, 2017, which is hereby incorporated by reference for all purposes as if fully set forth herein.

BACKGROUND OF THE INVENTION

1. Field of the Invention

The present disclosure relates to an autonomous driving support apparatus and method, and more particularly, to an autonomous driving support apparatus and method, which may generate road information, correct errors, and update road information for autonomous driving.

2. Description of the Prior Art

The automotive industry is developing an advanced driver assistance system (ADAS), which provides more convenience and safety to drivers. Typically, a system for predicting a forward road environment utilizing map information and providing appropriate control and convenience services is being commercialized.

In recent years, autonomous vehicles have been developed which enable a driver to navigate to a destination without having to operate a steering wheel, an accelerator pedal, or a brake. For autonomous driving, a lane departure warning system (LDWS), a lane keeping assistance system (LKAS), a blind spot detection (BSD), smart cruise control (SCC), and autonomous emergency braking (AEB) should operate organically.

In particular, precise road information is required to travel accurately and safely to the destination through autonomous driving, so that it is necessary to periodically correct error information of the road information to update the road information. However, until now, there is no definite specification for accurate road information generation, error correction, and updating of road information.

SUMMARY OF THE INVENTION

In this background, an aspect of the present disclosure is to provide an autonomous driving support apparatus and method, which may generate road information, correct errors, and update road information for autonomous driving.

In addition to the technical aspects of the present disclosure discussed above, other features and advantages of the disclosure will be set forth below, or may be apparent to those skilled in the art with which such a disclosure is concerned.

In accordance with an aspect of the present disclosure, there is provided an autonomous driving support apparatus, including: at least one autonomous vehicle configured to include an image sensor operable to be disposed at the autonomous vehicle so as to have a field of view exterior of the autonomous vehicle and configured to capture image data, a processor configured to process the image data captured by the image sensor, and a controller, responsive at least in part to processing by the processor of the image data, configured to sense a traveling road to generate camera recognition information including road information, signpost information, traffic light information, construction section information, and future route information and to transmit the generated camera recognition information to a server; and the server configured to analyze the received at least one piece of camera recognition information received from the at least one autonomous vehicle to update predetermined road map information and to transmit the updated road map information to the at least one autonomous vehicle.

The controller may generate a vehicle control signal for autonomous driving based on the camera recognition information and the road map information, and supplies the vehicle control signal to at least one of a driver warning controller, a head lamp controller, a vehicle posture controller, a steering controller, an engine controller, a suspension controller, and a brake controller of the autonomous vehicle.

The road map information may include attributes of a road on which the autonomous vehicle is traveling and adjacent roads, and the attributes of the road on which the autonomous vehicle is traveling and the adjacent roads includes a highway, a national road, a bifurcation point, a junction point, a one-way street, a speed limit, a road width, information indicating whether a corresponding road corresponds to a construction section, the number of lanes, speed limit information for each lane, and curvatures of lanes.

The camera recognition information may include lane information, signpost information, free space information, road edge information, road barrier information, road marker information, traffic light information, future route information, and landmark information.

The controller may compare the road map information with the camera recognition information, and corrects a global positioning system (GPS) error on the basis of the same landmark included in the road map information and the camera recognition information.

The controller may compare the road map information with the camera recognition information, and updates, when there is a difference between road information and signpost information included in the road map information and the camera recognition information, the road information and the signpost information.

When a lane of the traveling road is not recognized in the camera recognition information, the controller may recognize the lane according to a lane model generated based on GPS coordinates of the lane and GPS coordinates of the autonomous vehicle, and convert coordinates of the lane model into GPS coordinates to transmit the converted GPS coordinates to the server or to generate a vehicle control signal for autonomous driving according to the converted GSP coordinates.

In accordance with another aspect of the present disclosure, there is provided an autonomous driving support apparatus, including: at least one autonomous vehicle configured to include an image sensor operable to be disposed at the autonomous the vehicle so as to have a field of view exterior of the autonomous vehicle and configured to capture image data, and a domain control configured to process the image data captured by the image sensor, responsive at least in part to processing by the processor of the image data, to generate camera recognition information including road information, signpost information, traffic light information, construction section information, and future route information for a traveling road, to transmit the generated camera recognition information to a server, and to control an autonomous driving system of the autonomous vehicle; and the server configured to analyze the received at least one piece of camera recognition information received from the at least one autonomous vehicle to update predetermined road map information and to transmit the updated road map information to the at least one autonomous vehicle.

In accordance with still another aspect of the present disclosure, there is provided an image sensor operable to be disposed at an autonomous vehicle so as to have a field of view exterior of the autonomous vehicle and configured to capture image data, wherein the image data is processed by a processor and is used to generate camera recognition information including road information, signpost information, traffic light information, construction section information, and future route information for a traveling road, and the generated camera recognition information is transmitted to a server and is used to update predetermined road map information.

In accordance with yet another aspect of the present disclosure, there is provided an autonomous driving support method, including: generating camera recognition information of a road on which an autonomous vehicle is traveling using a controller disposed in the autonomous vehicle; determining a lane and a signpost by comparing road map information received from a server with the camera recognition information; transmitting the camera recognition information to the server; updating road map information stored in the server based on at least one piece of camera recognition information received from at least one autonomous vehicle; transmitting the updated road map information to the at least one autonomous vehicle; and controlling, by each of the at least one autonomous vehicle, the vehicle based on the received road map information.

The autonomous driving support method may further include correcting a GPS error on the basis of the same landmark included in the road map information and the camera recognition information.

The autonomous driving support method may further include analyzing reliability of the at least one piece of camera recognition information received from the at least one autonomous vehicle, and updating the road map information with the camera recognition information having the highest reliability.

The autonomous driving support method may further include performing lateral control and longitudinal control of the at least one autonomous vehicle based on the road map information; generating a new traveling route when it is determined that the road cannot be traveled on based on the at least one piece of camera recognition information, to perform autonomous driving; and transmitting information on the road that cannot be traveled on, to the server.

In addition, other features and advantages of the present disclosure may be newly understood through embodiments of the present disclosure.

As described above, an autonomous driving support apparatus and method according to an embodiment of the present disclosure may correct errors of road information to update the road information by comparing road information collected from a plurality of autonomous vehicles with a predetermined road map.

In addition, an autonomous driving support apparatus and method according to an embodiment of the present disclosure may analyze camera recognition information collected from a plurality of autonomous vehicles to update road information, signpost information, traffic light information, and future route information with the highest reliability in road map information. This makes it possible to improve the accuracy and safety of autonomous driving.

Effects which can be acquired by the present disclosure are not limited to the above described effects, and other effects that have not been mentioned may be clearly understood by those skilled in the art from the following description.

BRIEF DESCRIPTION OF THE DRAWINGS

The above and other aspects, features and advantages of the present disclosure will be more apparent from the following detailed description taken in conjunction with the accompanying drawings, in which:

FIG. 4 is a diagram illustrating an autonomous driving support method according to an embodiment of the present disclosure;

FIG. 5 is a diagram illustrating a lane determination method according to lane recognition or non-recognition of a camera and a road map according to an embodiment of the present disclosure.

DETAILED DESCRIPTION OF THE EXEMPLARY EMBODIMENTS

Figure 1:
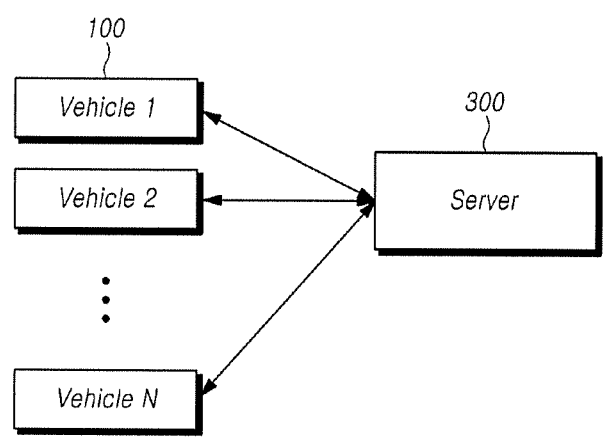
FIG. 1 is a diagram illustrating an autonomous driving support apparatus according to an embodiment of the present disclosure.

Hereinafter, embodiments of the present disclosure will be described in more detail with reference to the accompanying drawings so as to allow those skilled in the art to easily implement the present disclosure. However, the present disclosure may be implemented in various different forms and is not limited to embodiments described herein.

Parts irrelevant to the description are omitted to make the present disclosure clear, and the same reference numerals are designated to the same or similar components throughout the specification.

It will be understood that when one part is referred to as being "on" another part, it can be directly on another part or intervening parts may be present therebetween. In contrast, when a part is referred to as being "directly on" another part, there are no intervening parts therebetween.

It will be understood that, although the terms first, second, third, etc. may be used herein to describe various parts, components, regions, layers and/or sections, but are not limited thereto. These terms are only used to distinguish one part, component, region, layer, or section from another part, component, region, layer or section. Thus, a first part, component, region, layer, or section discussed below could be termed a second part, component, region, layer, or section without departing from the scope of the embodiments.

The technical terms used herein are to simply mention a particular exemplary embodiment and are not meant to limit the exemplary embodiments. An expression used in the singular encompasses the expression of the plural, unless it has a clearly different meaning in the context. In the specification, it is to be understood that the terms such as "including" or "having" etc., are intended to indicate the existence of specific features, regions, integers, steps, operations, elements, and/or components, and are not intended to preclude the possibility that one or more other specific features, regions, integers, steps, operations, elements, components, or combinations thereof may exist or may be added.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have idealized or excessively formal meanings unless clearly defined in the present application.

Hereinafter, exemplary embodiments will be described in detail with reference to the accompanying drawings so that they can be easily practiced by those skilled in the art. The exemplary embodiments may, however, be embodied in many different forms and should not be construed as being limited to the embodiments set forth herein.

FIG. 1 is a diagram illustrating an autonomous driving support apparatus according to an embodiment of the present disclosure.

Referring to FIG. 1, the autonomous driving support apparatus according to an embodiment of the present disclosure includes at least one autonomous vehicle 100 and a server 300. The autonomous vehicle 100 may generate camera recognition information including road information, signpost information, traffic light information, construction section information, and future route information by sensing a traveling road on which the vehicle is traveling. The autonomous vehicle 100 may compare the generated camera recognition information with road map information previously stored in a memory to update the road map information. In addition, the autonomous vehicle 100 may transmit the generated camera recognition information to the server 300.

The server 300 may receive the camera recognition information from each of the at least one autonomous vehicle. The server 300 may analyze the received at least one piece of camera recognition information to update predetermined road map information stored in the server 300. In this case, the server 300 may analyze the camera recognition information collected from each autonomous vehicle with respect to the same area of the traveling road and may update the road map information using the camera recognition information with the highest reliability. The server 300 may transmit the updated road map information to the at least one autonomous vehicle.

When the updated road map information is received from the server 300, the autonomous vehicle 100 may update the received road map information in the memory, and may generate a vehicle control signal for performing autonomous driving based on the received road map information. The autonomous vehicle 100 may perform autonomous driving according to the generated vehicle control signal.

Accordingly, it is possible to improve the accuracy and safety of autonomous driving by comparing road information collected from a plurality of autonomous vehicles with a predetermined road map and correcting errors of the road information to update the road information. Hereinafter, the operation of the autonomous driving support apparatus will be described in more detail with reference to the related drawings.

Figure 2:
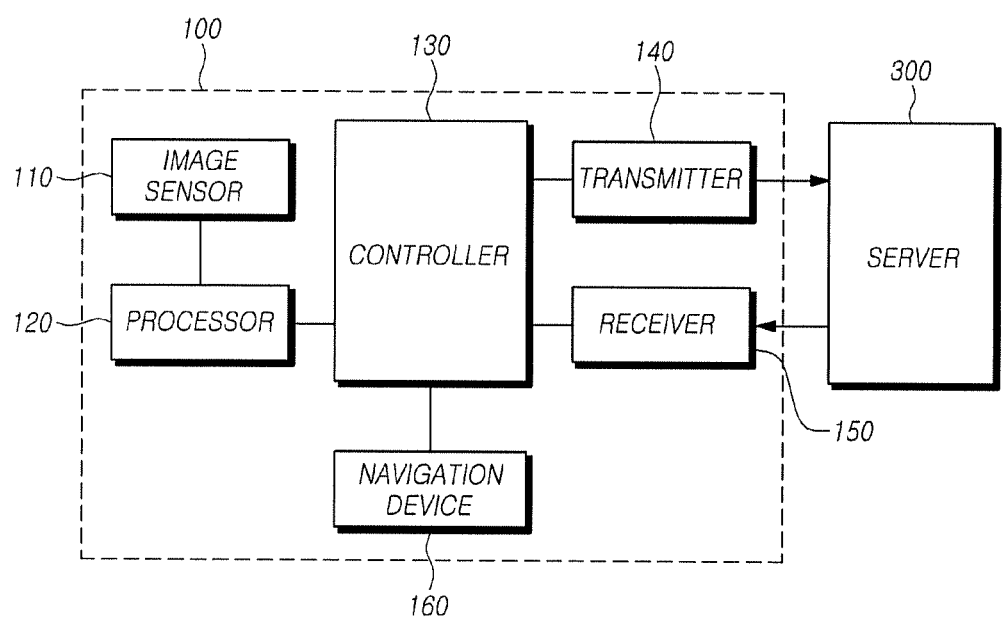
FIG. 2 is a block diagram illustrating an autonomous driving support apparatus according to an embodiment of the present disclosure.

FIG. 2 is a block diagram illustrating an autonomous driving support apparatus according to an embodiment of the present disclosure.

Referring to FIG. 2, the autonomous driving support apparatus may include at least one autonomous vehicle 100 and a server 300 disposed outside the vehicle. Each of the at least one autonomous vehicle 100 may include an image sensor 110, a processor 120, a controller 130, a transmitter 140, a receiver 150, and a navigation device 160.

The image sensor 110 may be disposed in the vehicle so as to have a field of view of the exterior of the autonomous vehicle. At least one image sensor 110 may be mounted on each portion of the vehicle so as to have a field of view for the front, side, or rear of the vehicle.

Since image information captured by the image sensor 110 is composed of image data, it may refer to image data captured by the image sensor 110. Hereinafter, in the present disclosure, the image information captured by the image sensor 110 refers to image data captured by the image sensor. The image data captured by the image sensor 110 may be generated in one format of, for example, Raw-type AVI, MPEG-4, H.264, DivX, and JPEG. The image data captured by the image sensor 110 may be processed by the processor 120.

The processor 120 may be operable to process the image data captured by the image sensor 110. For example, at least a portion of an operation of sensing a traveling road to generate camera recognition information may be executed by the processor 120.

The processor 120 may be implemented using at least one of electrical units capable of performing processing of image data and other functions, such as application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and the like. In addition, for example, the processor 120 may be implemented with one camera module together with the image sensor 110.

The controller 130 may control the overall operation of respective devices constituting the autonomous driving support apparatus. The controller 130 is configured to receive a processing result of the captured image data from the processor and to process the image data. The controller 130 may use the image data, which has been acquired by the image sensor 110 and processed by the processor 120, to generate camera recognition information including road information, signpost information, traffic light information, construction section information, and future route information which are related to the traveling road.

The controller 130 may compare the generated camera recognition information with road map information previously stored in a memory, and may update the road map information when there is a difference between the camera recognition information and the predetermined road map information. In addition, the controller 130 may transmit the generated camera recognition information to the server 300 through the transmitter 140. The controller 130 may receive the updated road map information based on the camera recognition information transmitted from the at least one autonomous vehicle at the server 300 via the receiver 150. The controller 130 may update the received road map information in the memory and may generate a vehicle control signal for performing autonomous driving based on the received road map information. The controller 130 may transmit the generated vehicle control signal to each of driving devices provided in the autonomous vehicle 100 via the transmitter 140. The receiver 150 receives the road map information through a wireless communication (e.g., 4G long term evolution {LTE}) scheme with the server 300, and provides the received road map information to the controller 130. In addition, the receiver 150 receives route setting of a driver and provides the received route setting of the driver to the controller 130. To this end, the receiver 150 may be communicatively coupled to a user input device enabling route setting. The user input device may be provided in the autonomous vehicle 100 or may be a separate terminal.

The transmitter 140 may transmit the camera recognition information provided from the controller 130, through the wireless communication (e.g., 4G LTE) scheme with the server 300. The transmitter 140 supplies the vehicle control signal input by the controller 130, to respective controllers of the vehicle such as a driver warning controller, a head lamp controller, a vehicle posture controller, a steering controller, an engine controller, a suspension controller, and a brake controller.

Here, the receiver 150 and the transmitter 140 are shown as separate components, but the present disclosure is not limited thereto. The receiver 150 and the transmitter 140 may be integrated into one device. In addition, the driver warning controller, the head lamp controller, the vehicle posture controller, the steering controller, the engine controller, the suspension controller, and the brake controller may be integrated together with the receiver 150 and the transmitter 140 to be implemented as a single domain control unit (DCU).

In addition, the transmitter 140 is connected to the server 300 through the wireless communication (e.g., 4G LTE) scheme and transmits the road map information input by the controller 130 to the server 300. Here, the road map information transmitted from the transmitter 140 to the server 300 may include a road map of which errors are corrected and update data of the road map information.

Figure 3A:
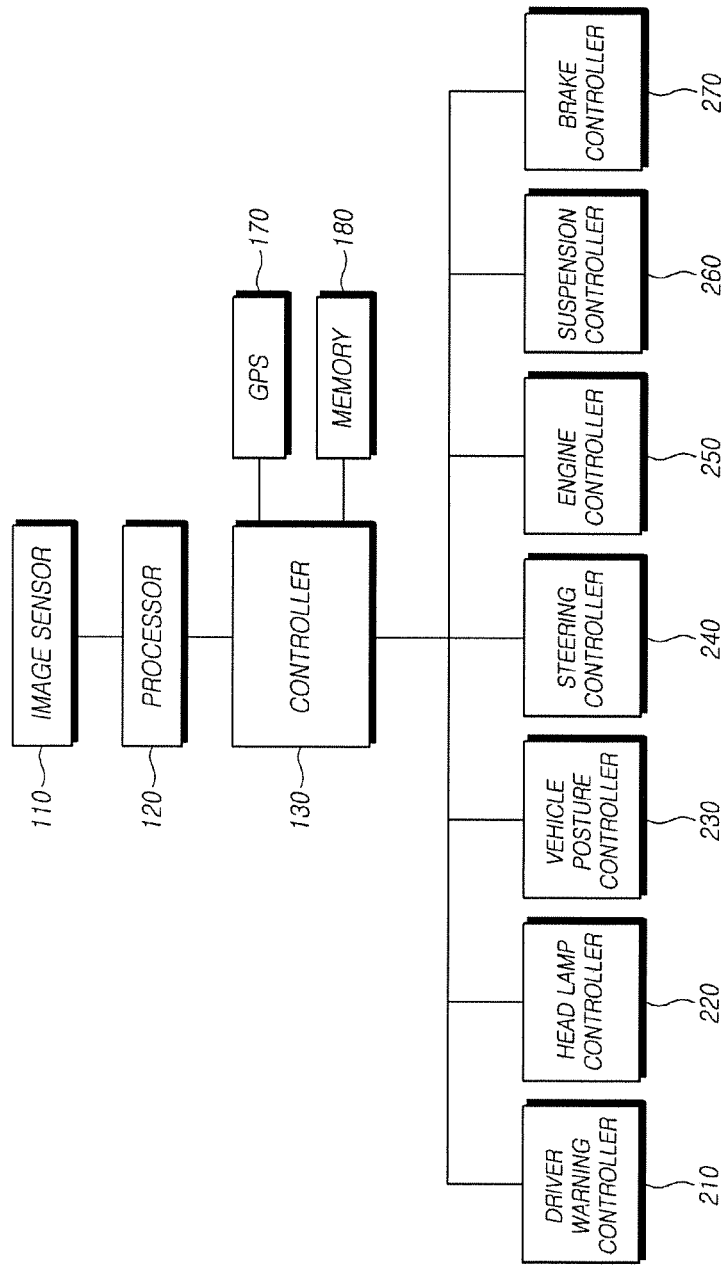
FIG. 3A is a block diagram illustrating an autonomous vehicle according to an embodiment of the present disclosure.
Figure 3B:
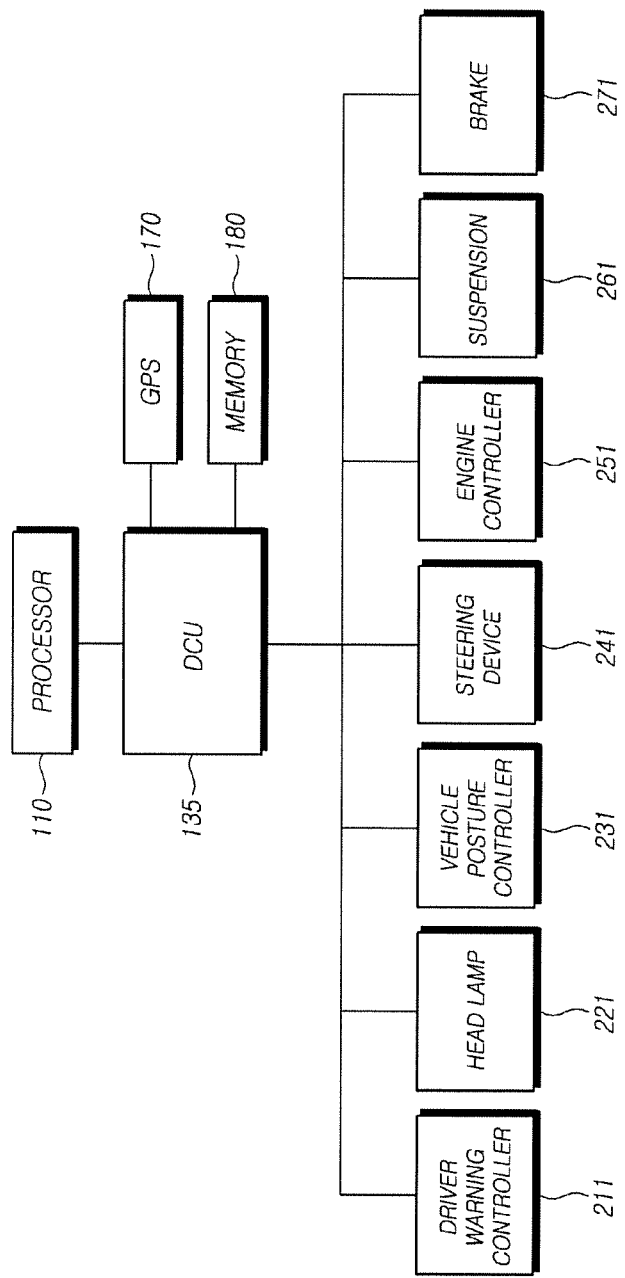
FIG. 3B is a block diagram illustrating an autonomous vehicle including a domain control unit (DCU) according to an embodiment of the present disclosure.

FIG. 3A is a block diagram illustrating an autonomous vehicle according to an embodiment of the present disclosure, and FIG. 3B is a block diagram illustrating an autonomous vehicle including a DCU according to an embodiment of the present disclosure.

Referring to FIG. 3A, the autonomous vehicle 100 may include an image sensor 110, a processor 120, a controller 130, a global positioning system (GPS) 170, and a memory 180.

According to an example, the image sensor 110 and the processor 120 may be implemented as camera modules. The camera module may be applied to a mono camera, a stereo camera, or a surround vision camera, and captures the front, rear, and left/right sides of the vehicle to generate image data. The image data generated by the camera module is provided to the controller 130.

According to an embodiment, the autonomous vehicle 100 may include at least one radar in addition to the image sensor 110, and may detect an object positioned at the front, rear, or left/right sides of the vehicle using the radar. Radar sensing data generated in the radar is provided to the controller 130.

A radar sensor or a radar system used in the present disclosure may include at least one radar sensor unit, for example, one or more of a frontal sensing radar sensor mounted on the front of the vehicle, a rear radar sensor mounted on the rear of the vehicle, and a lateral or lateral rear sensing radar sensor mounted on the lateral sides of the vehicle. Such a radar sensor or a radar system may include an electronic control unit (ECU) or a processor for analyzing a transmission signal and a reception signal to process data, thereby detecting information about an object. Data transmission from the radar sensor to the ECU or signal communication may utilize a communication link such as an appropriate vehicle network bus, or the like.

Such a radar sensor includes at least one transmission antenna for transmitting a radar signal and at least one reception antenna for receiving a reflected signal received from an object.

Meanwhile, the radar sensor according to the present embodiment may adopt a multi-dimensional antenna array and a signal transmission/reception scheme of multiple input multiple output in order to form a virtual antenna aperture larger than an actual antenna aperture.

For example, to achieve horizontal and vertical angular accuracy and resolution, a two-dimensional antenna array is used. Using a two-dimensional radar antenna array, signals are transmitted and received by two scans individually (temporally multiplexed) in the horizontal and vertical directions, and MIMO can be used in addition to a two-dimensional radar horizontal and vertical scans (time multiplexing).

More specifically, in the radar sensor according to the present embodiment, a two-dimensional antenna array configuration including a transmission antenna portion having a total of 12 transmission antennas Tx and a reception antenna portion having a total of 16 reception antennas Rx may be adopted and as a result, a total of 192 virtual reception antenna arrays may be provided.

At this time, the transmission antenna portion may include three transmission antenna groups including four transmission antennas. A first transmission antenna group may be spaced apart from a second transmission antenna group by a predetermined distance in the vertical direction, and the first or second transmission antenna group may be spaced apart from a third transmission antenna group by a predetermined distance D in the horizontal direction.

In addition, the reception antenna portion may include four reception antenna groups including four reception antennas, and each reception antenna group is arranged to be spaced apart in the vertical direction. The reception antenna portion may be disposed between the first transmission antenna group and the third transmission antenna group, which are spaced apart from each other in the vertical direction.

In addition, according to another embodiment, the antennas of the radar sensor may be arranged in a two-dimensional antenna array, and for example, each antenna patch may have a rhombus array, thereby reducing unnecessary side lobes.

Alternatively, the two-dimensional antenna array may include a V-shaped antenna array in which a plurality of radiation patches is arranged in a V-shape and more specifically, may include two V-shaped antenna arrays. At this time, a single feed may be performed at the apexes of each V-shaped antenna array.

Alternatively, the two-dimensional antenna array may include an X-shaped antenna array in which a plurality of radiation patches is arranged in an X-shape and more specifically, may include two X-shaped antenna arrays. At this time, a single feed may be performed at the center of each X-shaped antenna array.

In addition, the radar sensor according to the present embodiment may utilize an MIMO antenna system to implement sensing accuracy or resolution in both vertical and horizontal directions.

More specifically, in the MIMO system, each transmission antenna may transmit a signal having an independent waveform different from those of the other transmission antennas. That is, each transmission antenna may transmit a signal having an independent waveform different from those of the other transmission antennas, and each reception antenna may determine from which transmission antenna a reflected signal reflected from an object was transmitted due to the different waveforms of these signals.

In addition, the radar sensor according to the present embodiment may be configured to include a radar housing that accommodates a substrate including transmission/reception antennas and a circuit, and a radome that constitutes an appearance of the radar housing. At this time, the radome may be made of a material capable of reducing the attenuation of transmitted and received radar signals, and may be composed of front and rear bumpers, a grille, and side bodies of the vehicle, or outer surfaces of the vehicle components.

That is, the radome of the radar sensor may be disposed inside the grille, the bumper, the vehicle body of the vehicle, or the like, and may be disposed as a part of a component constituting the outer surface of the vehicle, such as a part of the grille, the bumper, or the vehicle body so that it is possible to provide the convenience of mounting the radar sensor while improving the vehicle aesthetics.

The GPS 170 may generate current position information of the vehicle and may provide the generated current position information to the controller 130.

In the memory 140, image data and road map information may be stored.

The controller 130 may compare camera recognition information including image data captured by the image sensor 110 during autonomous driving of the vehicle with road map information, may correct errors of information necessary for autonomous driving such as position information of the vehicle, road information, road edge information, lane information, signpost information, traffic light information, construction section information, future route information, and the like, and then may update the corrected errors to the road map information. Next, the updated road map information may be stored in the memory 180.

In addition, the controller 130 may generate a vehicle control signal for autonomous driving based on the camera recognition information and the road map information, and may supply the generated vehicle control signal to a driver warning controller 210, a head lamp controller 220, a vehicle posture controller 230, a steering controller 240, an engine controller 250, a suspension controller 260, and a brake controller 270 of the vehicle.

According to an example, the driver warning controller 210, the head lamp controller 220, the vehicle posture controller 230, the steering controller 240, the engine controller 250, the suspension controller 260, and the brake controller 270 of the vehicle may be integrated with the controller 130 to be implemented as a single DCU 135. In this case, the DCU 135 may directly control a vehicle driver warning device 211, a head lamp 221, a vehicle posture controller 231, a steering device 241, an engine controller 251, a suspension 261, a brake 271, and the like based on the generated vehicle control signal. Accordingly, the DCU 135 may perform autonomous driving by controlling an autonomous driving system provided in the autonomous vehicle 100.

The DCU 135 may be configured to receive image data captured by at least one image sensor and to process the received image data. The DCU 135 is provided in the vehicle and may communicate with the at least one image sensor mounted in the vehicle. To this end, an appropriate data link or communication link such as a vehicle network bus for data transmission or signal communication may be further included.

The receiver 150 provides the road map information received from the server 300 to the controller 130.

The road map information includes attributes of a road on which an occupant's own vehicle is traveling and of adjacent roads.

The attributes of roads include attributes assigned to roads such as highways, national roads, bifurcations, junctions, one-way streets, and the like. In addition, the road map information includes information, such as speed limits or road widths of the road on which the occupant's own vehicle is currently traveling or the adjacent roads, whether the corresponding road is a construction section, and the like. Also, the road map information includes the number of lanes of the road on which the occupant's own vehicle is currently traveling and the adjacent roads, speed limit information for each lane, and curvature of the lanes and a rate of change of the curvature.

The controller 130 photographs the front side to generate camera recognition information, and transmits the generated camera recognition information to the server 300 through the transmitter 140.

Here, the camera recognition information is used together with the road map information, and the camera recognition information includes lane information, signpost information, free space information, road edge information, road barrier information, road marker information, traffic light information, future route information, and landmark information. The server 300 analyzes camera recognition information received from a plurality of autonomous vehicles and updates the road map information as shown in Tables 1 and 2.

When there is a difference between the existing road map information and the camera recognition information received from the plurality of autonomous vehicles, the road map information is updated. At this time, the road map information is not updated only by the camera recognition information of one autonomous vehicle, and when there is a difference between the camera recognition information received from a certain number of autonomous vehicles and the existing road map information, the road map information is updated.

For example, the server 300 and the controller 130 compare the previously stored road map information with the camera recognition information input from a plurality of vehicles, and correct GPS errors based on the same landmark included in the road map information and the camera recognition information.

In addition, the server 300 may compare the previously stored road map information with the camera recognition information input from the plurality of vehicles, and may update the road information and the signpost information when there is a difference between the road information (including lane information) and the signpost information. The road map information updated in this way may be provided to the plurality of autonomous vehicles to improve the accuracy and safety of autonomous driving.

TABLE 1

| | Items | Information | Contents |
|---|---|---|---|
| Road information structure | Left sublane information | Position Lane | Global position Quality, type, offset, heading angle, curvature, curvature derivative |
| | Right sublane information | Position Lane | Global position Quality, type, offset, heading angle, curvature, curvature derivative |

TABLE 1-continued

| Items | Information | Contents |
|---|---|---|
| Left side lane information | Position Lane | Global position Quality, type, offset, heading angle, curvature, curvature derivative |
| Right side lane information | Position Lane | Global position Quality, type, offset, heading angle, curvature, curvature derivative |
| Signpost information | Position Speed limit Speed limit attribute Signpost Road mark | Global position, camera recognition position (X, Y, Z) |
| Traffic light information | Position Color Direction Lighting time | Global position, camera recognition position (X, Y, Z) Red, Orange, Green Arrow |

As shown in Table 1, the road map information includes left sub-lane information. The left sub-lane information includes a global position, quality, a type, offset, a heading angle of the left sub-lane, a curvature of the lane, and a rate of change of the curvature.

In addition, the road map information includes right sub-lane information. The right sub-lane information includes a global position, quality, a type, offset, a heading angle of the right sub-lane, a curvature of the lane, and a rate of change of the curvature.

In addition, the road map information includes left side lane information. The left side lane information includes a global position, quality, a type, offset, a heading angle of the left side lane, a curvature of the lane, and a rate of change of the curvature.

In addition, the road map information includes right side lane information. The right side lane information includes a global position, quality, a type, offset, a heading angle of the right side lane, a curvature of the lane, and a rate of change of the curvature.

In addition, the road map information includes signpost information. The signpost information includes a global position of the signpost and a camera recognition position (X, Y, Z).

In addition, the road map information includes traffic light information. The traffic light information includes a global position of the traffic light, a camera recognition position (X, Y, Z), a traffic light color (red, orange, and green), and direction indication (arrow).

TABLE 2

| | Items | Information | Contents |
|---|---|---|---|
| Road information structure | Left road edge information | Position Curvature Type | Global position, camera recognition position Guard rails, curb, road edge |
| | Right road edge information | Position Curvature Type | Global position, camera recognition position Guard rails, curb, road edge |

TABLE 2-continued

| Items | Information | Contents |
|---|---|---|
| Construction section information | Position Camera information | Global position Construction section recognition information |
| Traveling road information | Position Road type Speed limit Bifurcation/ Junction Traveling lane Road width | Vehicle position Highway, national road, overpass, tunnel, rotary Bifurcation/junction, entering, advancing Number of lanes, traveling lane number (target lane) |
| Future route information (Based on route change point) | Position Road type Speed limit Bifurcation, Junction Traveling lane Turn Road width | Global position Highway, national road, overpass, tunnel Bifurcation, Junction Number of lanes, traveling lane number (target lane) Left turn, right turn |

As shown in Table 2, the road map information includes left road edge information. The left road edge information includes a global position of the left road edge, a camera recognition position, and a type of the left road edge (whether the left road edge corresponds to a temporary guardrail, a curb, or a road edge).

In addition, the road map information includes right road edge information. The right road edge information includes a global position of the right road edge, a camera recognition position, and a type of the right road edge (whether the right road edge corresponds to a temporary guardrail, a curb, or a road edge).

In addition, the road map information includes construction section information. The construction section information includes a global position of the construction section and recognition information of the construction section.

In addition, the road map information includes traveling road information. The traveling road information includes a position of the occupant's own vehicle, a road type (highway, national road, overpass, tunnel, rotary, or general road), bifurcation point/junction point (bifurcation, junction, entering, or advancing), and traveling lane (the number of lanes or the traveling lane number).

In addition, the road map information includes future route information. The future route information includes a global position of the future route, a road type (highway, national road, overpass, tunnel, or general road), bifurcation point/junction point (bifurcation, junction, entering, or advancing), target lane (the number of lanes or the traveling lane number), and turn (left turn or right turn).

FIG. 4 is a diagram illustrating an autonomous driving support method according to an embodiment of the present disclosure.

Referring to FIG. 4, the method uses the controller 130 disposed in an autonomous vehicle to photograph a road on which the vehicle is traveling, thereby generating camera recognition information. In operation S10, the method corrects an error of a GPS by comparing road map information received from a server with the camera recognition information. Here, the method may correct the error of the GPS on the basis of the same landmark of the road map information and the camera recognition information.

Next, in operation S20, the method stores a deviation of items having a difference after comparing the road map information with the camera recognition information.

Next, in operation S30, the method catches the validity of a lane based on the road map information and the camera recognition information.

FIG. 5 is a diagram illustrating a lane determination method according to lane recognition or non-recognition of a camera and a road map according to an embodiment of the present disclosure. A method of determining a lane in an autonomous vehicle will be described with reference to FIG. 5.

(1) When a lane is recognized both in camera recognition information and road map information, the width/curvature of the lane is compared in the two pieces of information to filter a misrecognition result of the lane. Next, autonomous driving is performed using the filtered lane information.

(2) When the lane is not recognized in the camera recognition information and is recognized in the road map information, the lane information is corrected based on the road map information. Next, autonomous driving is performed using the lane information.

(3) When the lane is recognized in the camera recognition information and is not recognized in the road map information, autonomous driving is performed using the lane information of the camera recognition information.

(4) When the lane is not recognized in either the camera recognition information and the road map information, the lane is classified as lane non-recognition.

Here, when a deviation between the road map information and the camera recognition information is equal to or larger than a reference value, the lane information is used based on the road map information.

Next, in operation S40, the method checks the validity of a signpost based on the road map information and the camera recognition information. The method compares signpost information included in the road map information with signpost information included in the camera recognition information to correct a signpost non-recognition result and a signpost recognition result irrespective of the traveling direction. Autonomous driving is performed using the corrected signpost information.

Next, in operation S50, the method transmits the camera recognition information generated from each of a plurality of autonomous vehicles, to the server.

Next, in operation S60, the server receives the camera recognition information of the plurality of autonomous vehicles.

Next, in operation S70, the method analyzes the collected plurality of pieces of camera recognition information. Here, the method analyzes the reliability of the camera recognition information received from each of the plurality of autonomous vehicles. At this time, it is determined that the reliability of the same information collected the most is the highest.

Next, in operation S80, the method updates road map information stored in the server as camera recognition information having the highest reliability.

Next, in operation 90, the server transmits the road map information in which the camera recognition information having the highest reliability is updated, to the plurality of autonomous vehicles. Here, the road information may be mapped using image information received from the controller 130 when the reliability is insufficient.

Next, in operation S100, the autonomous vehicle controls the vehicle using the received road map information. The control of the vehicle may be roughly divided into lateral control and longitudinal control.

The lateral control of the vehicle for autonomous driving may control the vehicle to prevent collision when the vehicle is traveling next to a road structure such as a guardrail, a boundary wall, or a curb. That is, eccentricity and avoidance control may be performed in a direction opposite the structure. Meanwhile, when the vehicle is traveling on a lane-free section, lateral control of the vehicle may be performed using road edge information and road attribute information. In addition, based on future route information (information of a route to be passed at a future time point during traveling to a destination), a lane change may be automatically controlled so that the vehicle can enter from a current traveling route to a future route.

The longitudinal control of the vehicle for autonomous driving includes deceleration control at the time of determining a forward construction section, deceleration control at the time of traveling on a curved road, deceleration control and speed limit at the time of exceeding a speed limit. In addition, the longitudinal control of the vehicle for autonomous driving includes braking control when a stop signal is recognized, stopping the engine (providing fuel economy improvement effect) when the vehicle is stopped at the traffic light section, making a warning to a front vehicle when the front vehicle is not departing in front of the traffic light section, and automatic acceleration control when a start signal is recognized.

Next, there may be a case where traveling on existing roads is impossible due to road construction or maintenance. In the present disclosure, when it is determined that the existing route cannot be traveled on based on the camera recognition information, information on a road that cannot be traveled on is transmitted to the navigation device 160. In operation S110, the navigation device 160 sets a new traveling route.

Next, in operation S120, the controller 130 of the autonomous vehicle transmits the information on the road that cannot be traveled on, to the server.

Next, in operation S130, the autonomous vehicle transmits the new traveling route set by the navigation device 160 to the controller 130, updates the new traveling route, and then performs autonomous traveling.

Next, in operation S140, the server updates the information on the road that cannot be traveled on, which is received from the autonomous vehicle, to the road map information.

An autonomous driving support apparatus and method according to an embodiment of the present disclosure may correct errors of road information to update the road information by comparing the road information collected from a plurality of autonomous vehicles with a predetermined road map.

An autonomous driving support apparatus and method according to an embodiment of the present disclosure may analyze camera recognition information collected from a plurality of autonomous vehicles to update road information, signpost information, traffic light information, and future route information with the highest reliability to road map information. As a result, it is possible to improve the accuracy and safety of autonomous driving.

Figure 6:
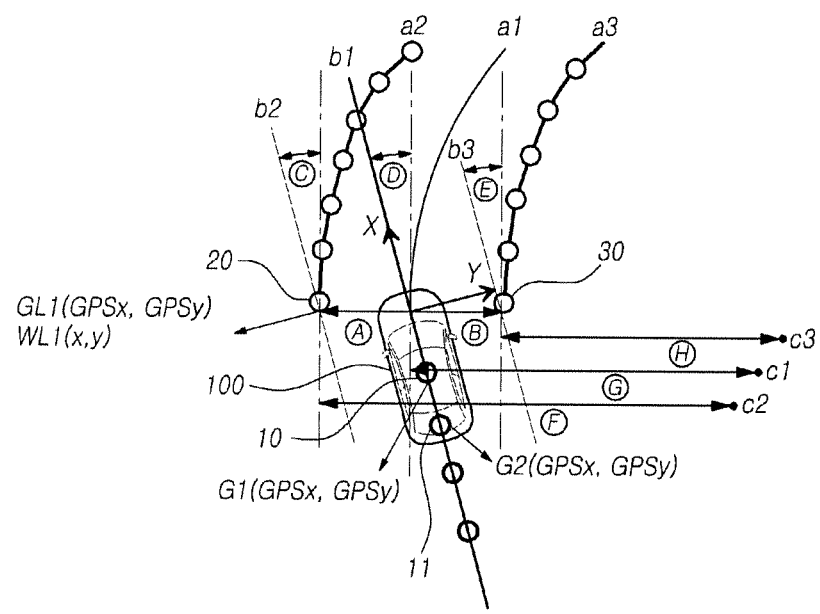
FIG. 6 is a diagram illustrating a lane recognition method at the time of lane non-recognition of an image sensor according to an embodiment of the present disclosure.

FIG. 6 is a diagram illustrating a lane recognition method at the time of lane non-recognition of an image sensor according to an embodiment of the present disclosure.

According to an embodiment, when a lane of a traveling road is not recognized in camera recognition information, the controller 130 may recognize the lane according to a lane model generated based on GPS coordinates of the lane and GPS coordinates of an autonomous vehicle. In addition, the controller 130 may convert coordinates of the lane model into GSP coordinates to transmit the obtained GSP coordinates to the server 300, or may generate a vehicle control signal for autonomous driving according to the converted GPS coordinates. In this regard, the controller 130 will be described below as an assumption, but the present disclosure is not limited thereto. According to another example, the operation of the controller 130 may be performed in substantially the same manner in the DCU 135 as well.

It is assumed that the lane is not recognized in image data by the image sensor as in the case where the autonomous vehicle 100 enters a curved traveling route or the like during traveling. However, the present disclosure is not limited to this, and may include various cases in which other lanes are not recognized.

Referring to FIG. 6, a progress line b1 at a current position 10 of the autonomous vehicle 100, and a left line b2 and a right line b3 based on a lane width are shown. The controller 130 may acquire GPS information on a lane on which the vehicle is traveling when the lane is not recognized through the image sensor. The GPS information on the lane may be acquired from road map information. Referring to FIG. 6, GPS information on arbitrary feature points 20 and 30 for actual curved lanes a2 and a3 can be acquired.

According to an embodiment, the controller 130 may may perform a curve fitting method to receive feature points having GPS coordinate values and to represent them as one line. The curve fitting method may be performed based on a multidimensional curve equation. A coefficient for the order of the curve equation can be obtained by merging the coordinate values corresponding to the feature points. For example, the simultaneous curve equation is calculated by assigning the coordinate values of the feature points to the curve equation, thereby generating a lane model.

Here, the curve fitting method refers to a method of calculating and obtaining a curve for a point with respect to points scattered on a plane, and the curve equation for the curve fitting method is expressed as Equation 1. However, this is merely an example, and the present disclosure is not limited thereto. The present disclosure is not limited to a specific lane model as long as it can perform lane recognition.

$$Y = C_{0f} + C_{1f}X + C_{2f}X^2 + C_{3f}X^3$$ [Equation 1]

$C_{0f}$: Lateral Offset(Lane Mark Position)
$C_{1f}$: Line Heading Angle(Lane Mark Heading Angle)
$2C_{2f}$: Line Curvature(Lane Mark Model A)
$6C_{3f}$: Line Curvature Derivative(Lane Mark Model d(A))

Here, a 0th-order coefficient C01 may be an offset (ⓒ, ⓓ, or ⓔ) indicating a lateral deviation in the traveling direction of the vehicle for a straight line in a tangential direction with respect to a center point (c1, c2, or c3) of a curved traveling route. Further, a 1st-order coefficient C11 may be a heading angle (ⓐ or ⓑ) which is direction information of a lane corresponding to the vehicle. In addition, a 2nd-order C21 and a 3rd-order C31 may be a curvature and a curvature derivative based on distances (ⓕ, ⓖ, and ⓗ) from the center points (c1, c2, and c3) of the curved traveling route.

The controller 130 may generate the lane model for the lane by calculating all of constants and 1st-order to 3rd-order coefficients of a cubic curve equation, using the GPS information at the various positions 10 and 11 of the vehicle. That is, the controller 130 may generate a lane model in which GPS coordinates GL1 of the lane are converted to world coordinates WL1. Therefore, the controller 130 may recognize the lane of the curved road on which the vehicle is traveling from the generated lane model.

The controller 130 may convert the world coordinates obtained in the generated lane model into GPS coordinates. That is, GPS coordinates of the entire lane may be obtained using the GPS information on the feature points of lane. The controller 130 may update road map information of the memory 180 using the lane information based on the converted GPS coordinates. In addition, the controller 130 may perform autonomous driving along a route a1 using the converted GPS coordinates and the GPS coordinates of the autonomous vehicle 100. In addition, the controller 130 may transmit the converted GPS information to the server. In this case, the server may receive the GPS information from at least one autonomous vehicle and may update the road map information.

Accordingly, even when the lane is not recognized by the image sensor, the lane can be recognized through the GPS information and autonomous driving can be performed.

A person skilled in the art to which the present disclosure pertains should apprehend that the present disclosure can be embodied in other specific forms without departing from the technical spirit or essential characteristics thereof. Therefore, the embodiments described above should be construed as being exemplified and not limiting the present disclosure. The scope of the present disclosure is not defined by the detailed description as set forth above but by the accompanying claims of the disclosure, and it should also be understood that all changes or modifications derived from the definitions and scopes of the claims and their equivalents fall within the scope of the disclosure.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both non-transitory computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

When exemplary embodiments are implemented by program code or code segments, each code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. Additionally, in some aspects, the steps and/or operations of a method or algorithm may reside as one or any combination or set of codes and/or instructions on a machine-readable medium and/or computer-readable medium, which may be incorporated into a computer program product.

For a software implementation, the techniques described herein may be implemented with modules (e.g., procedures, functions, and so on) that perform the functions described herein. Software codes may be stored in memory units and executed by processors. The memory unit may be implemented within the processor or external to the processor, in which case it can be communicatively coupled to the processor via various means as is known in the art.

For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alternatives, modifications and variations that fall within the spirit and scope of the appended claims. Furthermore, to the extent that the term "includes" is used in either the detailed description or the claims, such a term is intended to be inclusive in a manner similar to the term "comprising" as "comprising" is interpreted when employed as a transitional word in a claim.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can be executed from various computer readable media having various data structures stored thereon. The components may communicate by way of local and/or remote processes such as in accordance with a signal having one or more data packets (e.g., data from one component interacting with another component in a local system, distributed system, and/or across a network, such as the Internet, with other systems by way of the signal).

What is claimed is:

1. An autonomous driving support apparatus, comprising:
at least one autonomous vehicle configured to include an image sensor operable to be disposed at the autonomous vehicle so as to have a field of view exterior of the autonomous vehicle and configured to capture image data, a processor configured to process the image data captured by the image sensor, and a controller, responsive at least in part to processing by the processor of the image data, configured to sense a traveling road to generate camera recognition information including road information, signpost information, traffic light information, construction section information, and future route information and to transmit the generated camera recognition information to a server; and
the server configured to analyze the received at least one piece of camera recognition information received from the at least one autonomous vehicle to update predetermined road map information and to transmit the updated road map information to the at least one autonomous vehicle.

2. The autonomous driving support apparatus of claim 1, wherein the controller generates a vehicle control signal for autonomous driving based on the camera recognition information and the road map information, and supplies the vehicle control signal to at least one of a driver warning controller, a head lamp controller, a vehicle posture controller, a steering controller, an engine controller, a suspension controller, and a brake controller of the autonomous vehicle.

3. The autonomous driving support apparatus of claim 1, wherein the road map information includes attributes of a road on which the autonomous vehicle is traveling and adjacent roads, and the attributes of the road on which the autonomous vehicle is traveling and the adjacent roads includes a highway, a national road, a bifurcation point, a junction point, a one-way street, a speed limit, a road width, information indicating whether a corresponding road corresponds to a construction section, the number of lanes, speed limit information for each lane, and curvatures of lanes.

4. The autonomous driving support apparatus of claim 1, wherein the camera recognition information includes lane information, signpost information, free space information, road edge information, road barrier information, road marker information, traffic light information, future route information, and landmark information.

5. The autonomous driving support apparatus of claim 1, wherein the controller compares the road map information with the camera recognition information, and corrects a global positioning system (GPS) error on the basis of the same landmark included in the road map information and the camera recognition information.

6. The autonomous driving support apparatus of claim 1, wherein the controller compares the road map information with the camera recognition information, and updates, when there is a difference between road information and signpost information included in the road map information and the camera recognition information, the road information and the signpost information.

7. The autonomous driving support apparatus of claim 1, wherein, when a lane of the traveling road is not recognized in the camera recognition information, the controller recognizes the lane according to a lane model generated based on GPS coordinates of the lane and GPS coordinates of the autonomous vehicle, and converts coordinates of the lane model into GPS coordinates to transmit the converted GPS coordinates to the server or to generate a vehicle control signal for autonomous driving according to the converted GSP coordinates.

8. An autonomous driving support apparatus, comprising:
- at least one autonomous vehicle configured to include an image sensor operable to be disposed at the autonomous vehicle so as to have a field of view exterior of the autonomous vehicle and configured to capture image data, and a domain control unit (DCU) configured to process the image data captured by the image sensor, responsive at least in part to processing by the DCU of the image data, to generate camera recognition information including road information, signpost information, traffic light information, construction section information, and future route information for a traveling road, to transmit the generated camera recognition information to a server, and to control an autonomous driving system of the autonomous vehicle; and
- the server configured to analyze the received at least one piece of camera recognition information received from the at least one autonomous vehicle to update predetermined road map information and to transmit the updated road map information to the at least one autonomous vehicle.

9. The autonomous driving support apparatus of claim 8, wherein the DCU generates a vehicle control signal for autonomous driving based on the camera recognition information and the road map information, and controls at least one of a driver warning controller, a head lamp controller, a vehicle posture controller, a steering controller, an engine controller, a suspension controller, and a brake controller of the autonomous vehicle based on the vehicle control signal.

10. The autonomous driving support apparatus of claim 8, wherein the DCU compares the road map information with the camera recognition information, and corrects a GPS error on the basis of the same landmark included in the road map information and the camera recognition information.

11. The autonomous driving support apparatus of claim 8, wherein the DCU compares the road map information with the camera recognition information, and updates, when there is a difference between road information and signpost information included in the road map information and the camera recognition information, the road information and the signpost information.

12. The autonomous driving support apparatus of claim 8, wherein, when a lane of the traveling road is not recognized in the camera recognition information, the DCU recognizes the lane according to a lane model generated based on GPS coordinates of the lane and GPS coordinates of the autonomous vehicle, and converts coordinates of the lane model into GPS coordinates to transmit the converted GPS coordinates to the server or to generate a vehicle control signal for autonomous driving according to the converted GSP coordinates.

13. An image sensor operable to be disposed at an autonomous vehicle, which includes a processor and a controller, so as to have a field of view exterior of the autonomous vehicle and configured to capture image data, wherein the image data is processed by the processor and is used to generate, by the controller, camera recognition information including road information, signpost information, traffic light information, construction section information, and future route information for a traveling road, and the generated camera recognition information is transmitted to a server and is used to update predetermined road map information.

14. The image sensor of claim 13, wherein the camera recognition information and the road map information are used to generate a vehicle control signal for autonomous driving, and the vehicle control signal is supplied to at least one of a driver warning controller, a head lamp controller, a vehicle posture controller, a steering controller, an engine controller, a suspension controller, and a brake controller of the autonomous vehicle.

15. An autonomous driving support method, comprising:
- generating camera recognition information of a road on which an autonomous vehicle is traveling using a controller disposed in the autonomous vehicle, wherein the camera recognition information includes road information, signpost information, traffic light information, construction section information, and future route information;
- determining a lane and a signpost by comparing road map information received from a server with the camera recognition information;
- transmitting the camera recognition information to the server;
- updating road map information stored in the server based on at least one piece of camera recognition information received from at least one autonomous vehicle;
- transmitting the updated road map information to the at least one autonomous vehicle; and
- controlling, by each of the at least one autonomous vehicle, the vehicle based on the received road map information.

* * * * *